United States Patent

[11] 3,634,131

| [72] | Inventors | Larry R. Foster;<br>Jerry A. Cogan, Jr., both of Spartanburg, S.C. |
|---|---|---|
| [21] | Appl. No. | 798,814 |
| [22] | Filed | Feb. 12, 1969 |
| [45] | Patented | Jan. 11, 1972 |
| [73] | Assignee | Deering Milliken Research Corporation<br>Spartanburg, S.C. |

[54] FUGITIVELY COLORED SOLID MATERIALS
11 Claims, No Drawings

[52] U.S. Cl. .................................................117/161UC,
117/139.4, 117/161 P, 117/161 UB, 117/161
UT, 117/161 UZ, 260/78 SR
[51] Int. Cl. .......................................................B32b 27/06,
B32b 27/30
[50] Field of Search ......................................... 117/66, 62,
102, 161 UC, 161 UB, 6, 139.4

[56] References Cited
UNITED STATES PATENTS

| 3,090,762 | 5/1963 | Maeder et al. | 117/161 X |
| 3,123,496 | 3/1964 | Schlack et al. | 117/161 |
| 3,168,415 | 2/1965 | Goldstein et al. | 117/102 X |
| 2,047,398 | 7/1936 | Voss et al. | 117/161 X |
| 2,230,240 | 2/1941 | Gerhart | 117/161 X |
| 2,430,313 | 11/1947 | Vana | 117/161 X |
| 3,297,657 | 1/1967 | Arvat Gray et al. | 117/161 X |
| 3,377,249 | 4/1968 | Marco | 117/161 X |

FOREIGN PATENTS

| 959,815 | 6/1964 | Great Britain | 117/161 X |
| 86,219 | 9/1958 | Denmark | 117/161 |

*Primary Examiner*—William D. Martin
*Assistant Examiner*—Mathew R. P. Perrone, Jr.
*Attorneys*—Norman C. Armitage and H. William Petry

ABSTRACT: A pigment composition comprising a pigment and hydrophilic film-forming synthetic acid polymer comprising at least about 10 weight percent acid calculated as acrylic acid is described. The composition may be applied as a coating on any solid material, and the coating is characterized by its ability to be removed by a detergent solution.

FUGITIVELY COLORED SOLID MATERIALS

BACKGROUND OF THE INVENTION

This invention relates to pigment compositions which can be easily removed from surfaces of solid materials by a detergent solution, and more particularly, to pigment compositions comprising a pigment and certain hydrophilic film-forming binder materials.

Pigment compositions and paints are used on a very wide variety of materials including metal, wood, paper, textiles, leather, glass and plastics. In most applications, emphasis is placed on the need for permanent coatings which will resist the elements and maintain adhesion to the substrate over a long period of time. Considerable research has been and is being expended to develop dyestuffs for dyeing textile materials in such a way that permanent coloration is obtained.

On the other hand, there are known a number of so-called fugitive tints which can be either organic or inorganic materials which can be applied to materials, usually for identification or marking purposes, and removed when desired. However, the use of such tints for decorative purposes where a large area is to be covered has not been widely accepted because of the difficulty in obtaining uniform distribution of the color and because such fugitive tints are subject to water spotting. Other commercially available "washable" paints such as poster paints, finger paints, etc., when applied to fabrics either are not removable or are only removable under more severe extraction conditions.

Thus, there is a need for a pigment composition exhibiting good cover, which is available in a variety of shades and which resists water spotting but is easily removed from a surface. Moreover, such removal should not result in permanent damage to the substrate.

SUMMARY OF THE INVENTION

These problems have been overcome by providing a pigment composition comprising a pigment and a hydrophilic film-forming synthetic acid polymer comprising at least 10 weight percent acid calculated as acrylic acid. These compositions may be applied to solid substrates and air dried to deposit a coating which resists water spotting but which is removed easily on contact with a detergent solution.

DESCRIPTION OF THE PREFERRED EMBODIMENTS

The pigment compositions of the invention comprise a pigment and certain hydrophilic film-forming binder materials. It is not necessary that the binder material form a continuous film over the solid material to be painted but only that the material be capable of forming some type of film to which the pigment particles can adhere. Thus, the term "film-forming" as utilized in this application is given its broadest interpretation to include continuous as well as discontinuous films. The compositions of this invention, however, when applied to some solid substrates, will dry when exposed to air or some elevated temperature to form an adherent coating.

The pigments utilized in preparing the compositions of this invention include any of the known organic and inorganic pigments, whether natural or synthetic. Examples of organic pigments include the azo insoluble pigments such as toluidines, naphthol reds, benzidines and dinitraniline orange; the acid azo pigments such as lithol, Persian orange, and tartrazine; the anthraquinones such as alizarine and the vat colors; the indigoid pigments such as indigo blue and maroons; the phthalocyanine pigments such as phthalocyanine blues and greens; and the basic PNA and PTA pigments such as rhodamine malachite green, methyl violet and victoria blue. Examples of inorganic pigments include the natural red oxide pigments; zinc sulphide pigments such as zinc sulphide, lithopone, other extended zinc sulphide pigments such as calcium base lithopone, zinc sulphide extended with natural extenders; zinc oxide; antimony oxide; titanium pigments such as titanium dioxide, tinted titanium pigments, titanates such as barium, zinc, lead and magnesium titanates; etc. All of these pigments are discussed in detail in Volume II of *Organic Coating Technology*, "Pigments and Pigmented Coatings" by Henry F. Payne, John Wiley and Sons, Inc., New York, 1961.

In addition to the pigment, the compositions of the invention also contain a hydrophilic film-forming synthetic acid polymer comprising at least 10 weight percent acid calculated as acrylic acid. The term "film-forming" is used in its broadest sense and is not intended to be limited to continuous films.

The hydrophilic film-forming binder material is a synthetic acid polymer containing at least 10 weight percent acid calculated as acrylic acid, and more preferably, at least 20 percent acid. Synthetically produced acid polymers within the scope of the present invention can be prepared from any of the polymerizable organic acids, that is, those having reactive points of unsaturation. These polymers may be interpolymers of the acid and other monomers copolymerizable therewith so long as at least 10 weight percent acid monomer is present in the polymer. Examples of polymerizable acids that can be used include acrylic acid, maleic acid, fumaric acid, methacrylic acid, itaconic acid, crotonic acid, cinnamic acid, polymerizable sulfonic acids, and polymerizable phosphoric acids. Monomers that can be copolymerized with the acids include any monomers capable of copolymerizing with the acids and which will not detrimentally affect the properties of the polymer. Suitable monomers include esters of the above acids prepared by reacting the acid with an alkyl alcohol, for example, ethyl acrylate, methyl acrylate, propylacrylate, isopropylacrylate, methyl methacrylate, ethyl methacrylate, 2-ethylhexyl acrylate, butyl acrylate, etc.; alkyl fumarates, maleates and crotonates; halides; monomers having vinylidene groups such as styrene, acrylonitrile, and methyl styrene; substituted vinyl monomers such as chlorostyrene; and butadiene. It should be noted that the use of various mixtures of the above polymers are permissible. Furthermore, salts of the acid polymers such as the sodium, potassium, ammonium and lithium salts will afford the desired results.

Examples of some of the synthetic acid polymers that may be used according to the present invention are polymerization products of:

ethyl acrylate:acrylic acid;
ethyl acrylate:acrylic acid:acrylamide;
butyl acrylate:acrylic acid;
ethyl acrylate:methacrylic acid;
ethyl acrylate:itaconic acid;
methyl methacrylate:acrylic acid;
2-ethylhexyl acrylate:acrylic acid;
acrylamide:acrylic acid;
butyl acrylate:acrylic acid:acrylamide;
ethyl acrylate:acrylic acid:N-methylol acrylamide;
ethyl acrylate:acrylic acid:styrene;
ethyl acrylate:acrylic acid:hydroxy propyl methacrylate;
ethyl acrylate:acrylic acid:divinyl benzene;
ethyl acrylate:acrylic acid:allyl acrylamide;
ethyl acrylate:acrylic acid:glycidyl acrylate;
ethyl acrylate:itaconic acid;
ethyl acrylate:sodium styrene sulfonate;
ethyl acrylate:crotonic acid;
styrene:acrylic acid;
ethyl acrylate:acrylic acid:hydroxy ethyl methacrylate;
hydroxy ethyl methacrylate:acrylic acid:acrylamide; and
butyl acrylate:ethyl acrylate:acrylic acid.

As noted above, the acid polymer should contain at least about 10 percent by weight acid calculated as acrylic acid and preferably at least about 20 percent by weight acid. Copolymers of acrylic acid or methacrylic acid with an acrylate ester such as ethyl acrylate are considered to be especially useful.

Another very useful synthetic acid polymer is that obtained from the hydrolysis of polymers obtained from anhydrides of unsaturated dicarboxylic acids and a copolymerizable monomer having vinylidene groups such as styrenes, acrylonitrile etc., the styrenes being preferred. The term "an anhydride of an unsaturated dicarboxylic acid" includes those compounds represented by the formula

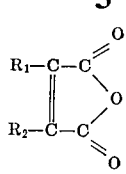

wherein $R_1$ and $R_2$ can be hydrogen, halogen, or an alkyl, aryl or aralkyl radical. Maleic anhydride is particularly useful but other anhydrides having the above formula such as monochloro maleic anhydride and itaconic anhydride may be employed. Obviously, mixtures of these anhydrides can be utilized also.

The term "a styrene" is used herein to refer to styrene or any of its various substituted derivatives such as halogen substituted styrenes, hydrocarbon-substituted styrenes, alkoxy-substituted styrenes, acyloxy-styrenes, nitro-styrenes, etc. Examples of such substituted styrenes include p-chloro styrene, p-ethyl styrene and m-nitro styrene. In most instances, however, it is preferred to use styrene itself by reason of its low cost, commercial availability and excellence as a component in the preparation of the copolymers.

The production of the styrene-anhydride copolymers and their conversion to acid copolymers and salts thereof by hydrolysis is well known and described in, for example, U.S. Pat. Nos. 2,047,398; 2,230,240; 2,430,313; and 3,297,657. The latter patent describes a process for preparing hydrolyzed copolymers of a styrene with maleic anhydride utilizing a reaction solvent which need not be removed after the polymerization reaction is completed and prior to hydrolysis.

As mentioned previously, the hydrolyzed copolymers of the dicarboxylic acid anhydrides with a styrene must contain at least 10 weight percent acid calculated as acrylic acid. Preferably, equal molar amounts of the anhydride and styrene are employed in the reaction although the ratio of styrene to maleic anhydride can vary from 0.8:1 to about 1.2:1. Details of the preparation of these copolymers are found in U.S. Pat. No. 3,297,657, which disclosure is incorporated herein by reference since there is no need to prolong this specification by including a description of well-known processes.

The ratio of pigment to binder in the pigment composition of the invention will depend upon the usual factors considered in paint chemistry when determining such ratios. That is, the ratio is experimentally determined taking into consideration such desired properties as hiding power, cover, shade, flexibility, mechanical strength, consistency and flow properties which are affected to varying degrees by this ratio, although many of these properties can be controlled by the inclusion of other additives. Ordinarily, pigment to binder ratios of from about 1:100 to 3:1 can be used. The size of the pigment particles is not critical but it has been observed that larger size particles have less tendency to penetrate porous articles such as fabrics.

In addition to the pigment and the binder, the composition of this invention will generally contain a solvent or some dispersing medium such as water. Examples of hydrocarbon solvents that may be employed include pentane, n-hexane, cyclohexane, n-heptane, isooctane, benzene, toluene and xylene. Commercially available hydrocarbon mixtures such as mineral spirits, gasoline, terpenes, solvent naphthas of aromatic, aliphatic or naphthenic types and alkyl benzenes having one to four carbon atoms in the alkyl group also are useful. The amount of solvent or dispersing medium incorporated into the composition will be determined by the desired consistency and viscosity characteristics.

As mentioned above, the physical characteristics of the pigment composition can be modified and altered by the inclusion of some of the usual additives such as plasticizers, thickeners, extender pigments, surface active agents, etc.

Surface active agents may serve several functions in the pigment compositions of the invention. When the compositions contain components of opposite polarity, for example, water in mineral oil systems, the agents make it possible to emulsify the components and to produce a stable mixture. Thus, the agents serve as emulsifying agents. The surface active agents also can serve as wetting agents which facilitate the wetting of the surface of a solid by the liquid. Many solids are not readily wetted by water because of the nature of the solid or of the presence of lubricants and other nonpolar materials absorbed on the surface during processing. Many textile materials which would not ordinarily be wetted by water systems are effectively wetted when the system contains a small amount of a suitable surface active agent. These agents also serve as dispersing agents which facilitate the dispersion of pigments in various vehicles. The improved dispersion is manifested by reduced time for mixing or grinding the pigment-vehicle mixture. Examples of surface active agents which perform the above functions as well as others include such materials as oleic and other organic acids; zinc naphthenate; lecithin, (a triglyceride of soybean oil); hydrogenated castor oil; zinc and lead soaps; aluminum and calcium stearates; aluminum alcoholates; silicone oils; and pine oil.

Another type of additive widely used is the so-called "bodying agent." These additives increase the consistency of the paint by producing a thixotropic condition. Metallic soaps have been widely used as bodying and antisettling agents. Examples of metal stearates which are useful include the aluminum, zinc, magnesium, calcium and lead stearates. Thixcin is a commercially available bodying agent (Bake Castor Oil Co.) which is a white powder which produces a gel when from 1 to 5 percent of the powder is dispersed in a variety of solvent. The fine particle size silica pigments such as those marketed under the trade names of Santocel, Cab-O-Sil and Syloid increase the consistency of pigment compositions. Certain organic resins also increase the viscosity of pigment compositions by forming gels when added to the systems. The Omamid polyamide type resins available from Olin Mathieson Chemical Corporation are examples of such resins which can be dispersed in solvents to produce thixotropic conditions.

Extender pigments are much lower in price than the prime pigments and are used in paints to reduce the cost and improve properties such as consistency, leveling, and pigment settling. Extender pigments are obtained either by pulverization of certain rocks and sedimentary deposits, or by chemical precipitation. The first are referred to as natural extenders, and are obtained from such natural deposits as limestone, quartz and clay. A number of such extenders and their properties are described in *Organic Coating Technology, Volume II*, by Henry F. Payne, J. Wiley and Sons, Inc., New York, 1961. Chapter 18 is devoted to extender pigments.

The clay pigments (aluminum silicates) have been found to be particularly useful as extender pigments, primarily because of the added properties obtained. The pigment compositions of this invention containing clays such as bentonite have been found to exhibit improved cover and fugitivity. That is, such pigment compositions are more easily removed from a solid article by a detergent solution. Bentonite is a type of clay obtained from montmorillonite minerals having the general formula $Al_2O_3 \cdot 4SiO_3 \cdot 2H_2O$, although the aluminum can be replaced to varying degrees with other cations such as magnesium or sodium. Fuller's earth is another form of clay which contains considerable amounts of magnesium. In addition to the properties described above, the clay minerals such as bentonite also display strong colloidal properties, especially in water. When added to pigment compositions containing water, they are thixotropic.

The flexibility of pigment compositions can be improved or controlled by the addition of plasticizing agents. Examples of suitable plasticizers include glycerine, glycerol, dioctyl phthalate, etc.

The following examples illustrate the pigment compositions of the invention. Unless otherwise indicated, all parts and percentages are by weight.

EXAMPLE 1

| | Parts by Weight |
|---|---|
| Copper phthalocyanine pigment | 2 |
| Emulsion copolymer of ethyl acrylate:acrylic acid (70:30), 20% solids | 60 |

EXAMPLE 2

| | |
|---|---|
| Titanium dioxide (35% aqueous paste) | 8 |
| Emulsion copolymer of Example 1 | 20 |
| Water | 5 |

EXAMPLE 3

| | |
|---|---|
| Nickel azo yellow | 3 |
| Emulsion copolymer of Example 1 | 20 |
| Glycerine | 3 |
| Carboxymethyl cellulose (2% in water) | 10 |
| Bentonite 660 (10% in water; available from National Lead Company) | 10 |

EXAMPLE 4

| | Parts by Weight |
|---|---|
| Toluidine red | 10 |
| Emulsion copolymer of Example 1 | 40 |
| Carboxymethyl cellulose (2% in water) | 20 |

EXAMPLE 5

| | |
|---|---|
| Red Iron oxide | 4 |
| Emulsion copolymer of Example 1 | 25 |
| Bentonite 660 (10% in water) | 20 |
| Water | 70 |

EXAMPLE 6

| | |
|---|---|
| Molybdate orange (25% solids in water) | 30 |
| A hydrolyzed maleic anhydride:styrene copolymer (49:51 weight ratio) prepared in accordance with the procedure of Example II of U.S. Pat. No. 3,297,657 utilizing a 50% aqueous solution of sodium hydroxide (20% in water) | 20 |
| Bentonite 660 (10% in water) | 20 |
| Water | 50 |

EXAMPLE 7

| | |
|---|---|
| Cadmium yellow (25% in water) | 30 |
| Hydrolyzed copolymer of Example 6 | 20 |
| Acrylic emulsion of Example 1 | 20 |
| Glycerine | 5 |
| Bentonite 660 (10% in water) | 20 |

EXAMPLE 8

| | Parts by Weight |
|---|---|
| Chromium oxide green | 5 |
| Copolymer of ethyl acrylate:itaconic acid (70:30) | 10 |
| Bentonite 660 (10% in water) | 20 |
| Water | 20 |

EXAMPLE 9

| | |
|---|---|
| Titanium dioxide | 100 |
| Polymer of ethyl acrylate acrylic acid:acrylamide | 50 |
| Glycerine | 40 |
| Naphtha | 200 |

The pigment composition of this invention can be used on and applied to a wide variety of solid materials including metal, wood, paper, textiles, leather, glass and plastics. As mentioned previously, the advantage of utilizing these pigment compositions is that they can be easily removed by treatment with a detergent solution but they do not water-spot. After preparing the compositions by the usual paint techniques, the pigments are applied to the solid materials by an appropriate technique such as brushing, spraying, dipping, flow coating, printing, knife coating, roller coating, and tumbling. After the pigment composition has been applied to the solid material it can be dried either at room temperature or placed in a heated room or oven for a lesser period of time.

The pigments of this invention are particularly useful for painting textile fabrics since textile fabrics lend themselves to machine washing. When a textile fabric containing a design of the pigment composition of the invention is placed in a washing machine with a suitable detergent, the pigment is completely removed from the fabric at the end of the washing cycle.

The textile fabrics which can be painted with the pigment compositions of this invention include virtually every type of fabric since the nature of the substrate is not critical. Thus, the fabrics may be woven, nonwoven, or knitted, and may be composed of any and all types of fibers including natural and synthetic fibers. Examples of natural fibers include flax, cotton, wool, ramie, alpaca vicuna, mohair, cashmere, fur, suede and silk. Synthetic fibers include polyamides such as polyhexamethylene adipamide; polyesters such as polyethylene terephthalate; acrylic fibers such as polyacrylonitrile, and homopolymers or copolymers of acrylonitrile such as acrylonitrile/methylacrylate (85:50); and cellulosic derivatives such as cellulose acetate and viscose rayon.

Blends of synthetic and natural fibers may also be used to prepare the textile fabrics. Examples of such fabrics include wool/nylon (85:15); Acrilan/wool (55:45); Orlon/wool (65:35); Dacron/wool (55:45); wool/rayon (65:35); wool/rayon/nylon (65:25:10); Dacron/cotton (65:35) etc. Dacron is a polyester fiber manufactured by E. I. du Pont de Nemours and Company. Orlon is a polyacrylonitrile fiber manufactured by DuPont. Acrilan is a polyacrylic fiber manufactured by Chemstrand, a division of Monsanto. Nylon is a polyamide fiber manufactured by DuPont.

Fabrics of the types discussed above may be painted with the pigments of this invention either as formed, or the fabrics may be given any of the wide variety of fabric treatments available in the art today for improving specific properties of the fabric. For example, the processes described in U.S. Pat. No. 3,377,249, for improving the soil removability and durable press characteristics of polyester containing fabrics can be carried out on the fabrics prior to painting. Furthermore, the fabrics may be given fluorochemical water and oil repellency treatments such as Scotchgard or Zepel treatments prior to painting. Such treatments, however, are now necessary to the fugitivity of the pigment compositions of this invention, but are utilized merely to provide additional desirable properties such as permanent press.

The solid materials painted with the pigment compositions of this invention may have any shape, configuration or utility. Such materials include, without limitation, wall paper, synthetic wall coverings, lamp shades, automobile seat covers, automobile upholstery, upholstery for furniture; canvass products such as tents and folding cots; draperies; table cloths; throw pillows; hassocks; sporting goods; garments bags and luggage; shoes, book covers, mattress covers; stuffed toys; deck chairs; and all forms of clothing and apparel accessories such as pants, slacks, shirts, sweatshirts, jackets, neckties, belts, scarves, hats, etc.

As mentioned previously, one of the advantages of the pigments of this invention is that they are easily removed from a solid material by a detergent. Solid objects such as plastic or metal toys, glass or plastic decorations, etc., can be painted with any design with the pigments of the invention, and these paints can be later removed by washing the objects with a detergent solution. On the other hand, where the painted object lends itself to washing in a washing machine or a dishwasher these objects can be placed in these machines and subjected to an ordinary washing cycle with available detergents.

Since these pigment compositions are fugitive, they can be used also to color solid products which are consumed. For example, soaps can be colored with these compositions without fear of permanently discoloring towels, clothes etc. Likewise, tooth paste can be colored with these compositions and any paste on clothes can be easily removed leaving no color.

Since the pigment compositions of this invention can be easily removed from a substrate by washing the pigment with a detergent solution, there are a large number of practical as well as novel applications for the pigment compositions.

These compositions can be utilized by children in art classes or at home without fear of damage to the clothes they are wearing, the floor, walls and any other object that may be near. Should any of the pigment compositions spill or splatter onto clothes, simply washing in a washing machine will result in complete removal of the pigment composition. Such fugitivity is not observed when the presently commercially available poster paints, water colors, etc., are spilled onto clothes or other objects.

Other uses for the pigment compositions appear to be limited only by one's imagination. For example, the pigment compositions provide a novel composition which can be utilized by teenagers and others to paint articles on clothing such as sweatshirts, tee shirts, pants, hats and neckties, either completely or in any desired design such as one's name, hearts, flowers, etc., which designs can be removed by washing the garment. After removal of the design, a new design can be applied in the same manner.

Although the pigment compositions of this invention are fugitive in that they can be removed by a detergent solution, they are not so fugitive as the fugitive tints utilized for marking and identifying many materials including textile materials. The compositions of this invention do not water-spot and they require a detergent for complete removal.

That which is claimed is:

1. Fugitively colored solid materials having a surface coating thereon of a pigment composition comprising a pigment and a hydrophilic film-forming synthetic acid polymer comprising at least about 20 percent acid calculated as acrylic acid.

2. The solid material of claim 1 wherein the acid polymer is prepared from the monomeric mixture comprising an acrylic ester and an acrylic acid.

3. The colored solid material of claim 1 wherein the solid material is a textile fabric.

4. The colored solid material of claim 1 wherein the acid polymer is a hydrolyzed copolymer of a styrene and an anhydride of an unsaturated carboxylic acid.

5. The solid material of claim 4 wherein the anhydride is maleic anhydride.

6. The solid material of claim 1 wherein the pigment composition consists essentially of a pigment and a hydrophilic film-forming synthetic acid polymer comprising at least about 20 percent acid calculated as acrylic acid.

7. A process for selectively and repeatedly painting the surface of a textile material comprising
   a. applying to the textile material a pigment composition comprising a pigment and a hydrophilic film-forming synthetic acid polymer comprising at least about 20 weight percent acid calculated as acrylic acid;
   b. removing the pigment composition by washing the material in a detergent solution; and
   c. applying to the washed textile material a pigment composition comprising a pigment and a hydrophilic film-forming synthetic acid polymer comprising at least about 20 weight percent acid calculated as acrylic acid.

8. The process of claim 7 wherein the pigment composition of (c) is different from the pigment composition of (a).

9. The process of claim 7 wherein the acid polymer is prepared from a monomer mixture comprising an acrylic ester and an acrylic acid.

10. The process of claim 7 wherein the textile material has been treated with a composition comprising an aminoplast textile resin and a textile resin catalyst and cured prior to the application of the pigment composition to provide durable press characteristics.

11. The process of claim 10 wherein the composition also contains a synthetic acid emulsion polymer comprising at least 20 weight percent acid calculated as acrylic acid.

* * * * *